United States Patent
Chen et al.

(10) Patent No.: US 12,212,468 B2
(45) Date of Patent: Jan. 28, 2025

(54) SYSTEM AND METHOD FOR MANAGING NETWORK TOPOLOGY FOR METAVERSE SERVICES

(71) Applicant: T-Mobile Innovations LLC, Overland Park, KS (US)

(72) Inventors: Zhisheng Chen, Overland Park, KS (US); Marouane Balmakhtar, Fairfax, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 32 days.

(21) Appl. No.: 18/315,709

(22) Filed: May 11, 2023

(65) Prior Publication Data

US 2024/0380667 A1  Nov. 14, 2024

(51) Int. Cl.
*H04L 41/12* (2022.01)
*H04L 41/5003* (2022.01)

(52) U.S. Cl.
CPC .......... *H04L 41/12* (2013.01); *H04L 41/5003* (2013.01)

(58) Field of Classification Search
None
See application file for complete search history.

(56) References Cited

U.S. PATENT DOCUMENTS

| | | | | |
|---|---|---|---|---|
| 6,954,736 B2 * | 10/2005 | Menninger | .......... | G06Q 10/087 705/28 |
| 7,225,249 B1 * | 5/2007 | Barry | ...................... | H04L 41/28 709/227 |
| 7,830,813 B1 * | 11/2010 | Lo | ...................... | G06F 11/3447 370/254 |
| 2010/0192120 A1 * | 7/2010 | Raleigh | ................... | H04W 4/12 717/101 |
| 2010/0192170 A1 * | 7/2010 | Raleigh | ............. | G06Q 30/0241 725/1 |
| 2022/0210025 A1 | 6/2022 | Tsujino | | |

* cited by examiner

*Primary Examiner* — Quang N Nguyen
(74) *Attorney, Agent, or Firm* — Jones Robb, PLLC

(57) ABSTRACT

Systems, methods, and processing nodes for managing network topology perform and/or comprise: receiving user metrics associated with a community of interest; obtaining network-associated requirements for each of a plurality of services deployed on a network, at least a portion of the plurality of services being metaverse services; obtaining computing-system-associated requirements for each of the plurality of services; and based on the user metrics, the network-associated requirements, and the computing-system-associated requirements, generating a network-site implementation plan recommendation that minimizes one or more cost functions.

17 Claims, 4 Drawing Sheets

SYSTEM AND METHOD FOR MANAGING NETWORK TOPOLOGY FOR METAVERSE SERVICES

TECHNICAL BACKGROUND

The term "metaverse" is frequently used to refer to a set of internet services which collectively provide for a virtual environment in which a large number of users interact with one another and with the virtual world. The metaverse implicates a large number of technical fields in support of the user experience, including the telecommunications technologies required to connect large numbers of users across vast distances, and to deliver large quantities of data efficiently and reliably.

These connections and data are provided over networks of varying topology; that is, over network paths that include different towers, access sites, switches, routers, and the like. Moreover, different metaverse services may require different distribution topologies even for the same user. For example, a given metaverse service may have its own network requirements based on factors such as latency, bandwidth per average user, packet loss ratio, service availability, and the like. Users of metaverse services may have their own requirements based on factors such as geographic distribution, connection availability, and the like.

Overview

Various aspects of the present disclosure relate to systems and methods of managing network topology in a telecommunications network, such as a network providing metaverse services.

In one exemplary aspect of the present disclosure, a method of managing network topology comprises receiving user metrics associated with a community of interest; obtaining network-associated requirements for each of a plurality of services deployed on a network, at least a portion of the plurality of services being metaverse services; obtaining computing-system-associated requirements for each of the plurality of services; and based on the user metrics, the network-associated requirements, and the computing-system-associated requirements, generating a network-site implementation plan recommendation that minimizes one or more cost functions.

In yet another exemplary aspect of the present disclosure, a node comprises at least one processor programmed to perform multiple operations, the operations including receiving user metrics associated with a community of interest; obtaining network-associated requirements for each of a plurality of services deployed on a network, at least a portion of the plurality of services being metaverse services; obtaining computing-system-associated requirements for each of the plurality of services; and based on the user metrics, the network-associated requirements, and the computing-system-associated requirements, generating a network-site implementation plan recommendation that minimizes one or more cost functions.

In yet another exemplary aspect of the present disclosure, a non-transitory computer-readable medium stores instructions that when executed by a processor cause the processor to perform operations comprising receiving user metrics associated with a community of interest; obtaining network-associated requirements for each of a plurality of services deployed on a network, at least a portion of the plurality of services being metaverse services; obtaining computing-system-associated requirements for each of the plurality of services; and based on the user metrics, the network-associated requirements, and the computing-system-associated requirements, generating a network-site implementation plan recommendation that minimizes one or more cost functions.

In this manner, these and other aspects of the present disclosure provide for improvements in at least the technical field of telecommunications, as well as the related technical fields of network management, device management, network security, wireless communications, and the like.

This disclosure can be embodied in various forms, including hardware or circuits controlled by computer-implemented methods, computer program products, computer systems and networks, user interfaces, and application programming interfaces; as well as hardware-implemented methods, application specific integrated circuits, field programmable gate arrays, and the like. The foregoing summary is intended solely to provide a general idea of various aspects of the present disclosure, and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

Figure 1:
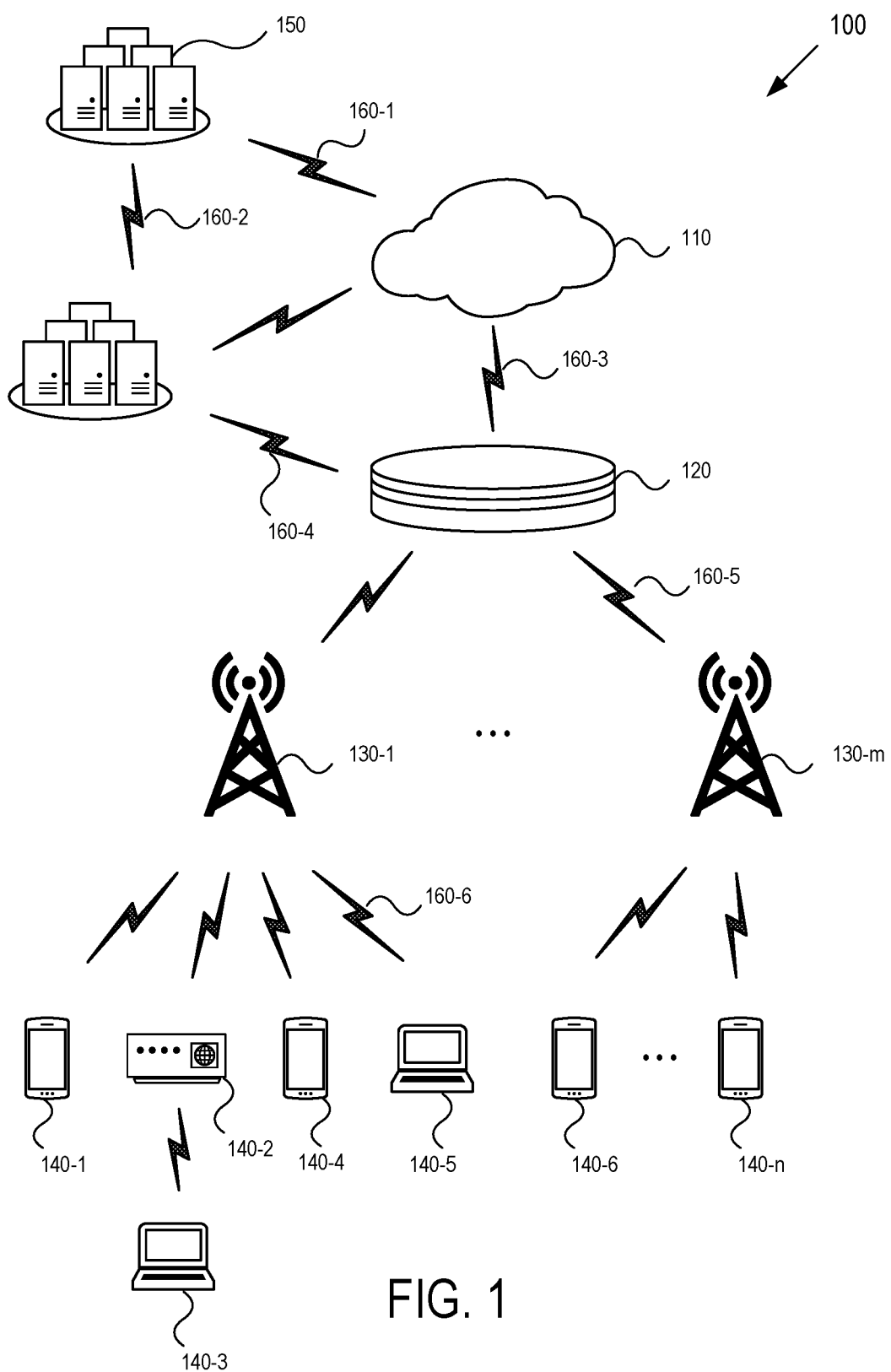
FIG. 1 illustrates an exemplary system for wireless communication in accordance with various aspects of the present disclosure.

In the following description, numerous details are set forth, such as flowcharts, schematics, and system configurations. It will be readily apparent to one skilled in the art that these specific details are merely exemplary and not intended to limit the scope of this application.

In addition to the particular systems and methods described herein, the operations described herein may be implemented as computer-readable instructions or methods, and a processing node or nodes on the network for executing the instructions or methods. The processing node or nodes may include an electronic processor included in the access node and/or an electronic processor included in any controller node in the wireless network that is coupled to the access node.

While the following description provides several examples of network topology management in the context of the provision of metaverse services, the present disclosure is not so limited. The systems, methods, algorithms, and nodes described herein may generally be applicable to any situation in which there exists a need or desire to manage network topology in telecommunications networks, regardless of the content or service types such networks provide.

As noted above, different metaverse services may have different requirements relating to network factors such as latency, bandwidth, and overall speed. These factors are affected by the network topology over which the services are delivered (i.e., the set of network paths over which data propagates from source to endpoint, each path including a series of segments 220 sometimes referred to as "hops"). For example, network providers may be concerned with selecting particular sites of network equipment (such as towers, switches, routers, and so on) against homogeneous service traffic based on available connections, projected traffic profile, geographic location of originating and terminating users (sometimes referred to as "community of interest"). In addition to latency factors, traffic assurance is affected by policy, such as class of service, quality of service (QoS), and routing. For metaverse services in particular, due to the significant differences in characteristics and requirements (e.g., for bandwidth, latency, and computing system capabilities) from service to service, network providers typically consider and compare multiple different topologies for providing the metaverse services. However, if a network provider selects too many sites for deployment to support metaverse services, the cost of such a deployment may be excessively large. On the other hand, if a network provider chooses too few sites or selects sites which are insufficient for the deployment, the network may exhibit latency that is too large for certain metaverse services and/or may exhibit uneven bandwidth or resource loads. Thus, there exists a need to provide a service deployment topology which fits the demands of the community of interest (i.e., the morphology of user distribution), is financially feasible for the service provider, and improves the user experience, all while adhering to real-world space and system constraints.

Accordingly, the present disclosure provides for systems, methods, and devices which manage network topology for deployments, such as metaverse service deployments. Various aspects of the present disclosure provide for persistent high data rate support and advanced edge capabilities in current-generation and next-generation networks. The present disclosure provides for an approach which explicitly considers an operational procedures and technical implementations (e.g., via an integer programming model) to determine and implement a network topology which comports with network requirements, user requirements, cost requirements, and network and connectivity capacity constraints. Thus, the present disclosure permits users to access metaverse services via their user equipment (UE), such as wireless devices, over wireless network infrastructure with a high degree of efficiency, reliability, and workability.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node. Additionally, "wireless device" may encompass any type of wireless device, such as a smartphone, a tablet, a laptop computer, a desktop computer with wireless communication capabilities, and so on. The term "wireless device" is used interchangeably with the term "wireless communication device" herein.

In accordance with various aspects of the present disclosure, a cellular or wireless network may be provided by an access node. While examples described herein may include at least an access node (or base station), such as an Evolved Node B (eNodeB) or a next-generation Node B (gNodeB), and one or a plurality of end-user wireless devices; however, the present disclosure is not limited to such a configuration. Various aspects of the present disclosure may also be applied to communication between an end-user wireless device and other network resources, such as relay nodes, controller nodes, antennas, and so on. Moreover, multiple access nodes may be utilized. For example, some wireless devices in the network may communicate with an Long-Term Evolution (LTE) eNodeB, while others may communicate with an New Radio (NR) gNodeB, while still others may communicate with a Non-Terrestrial Network (NTN) satellite. Additionally, for purposes of illustration and explanation, various portions of this detailed description refer to implementations in a network a 5G NR radio access technology (RAT); however, the present disclosure is not so limited. The systems and methods described herein may be implemented in a network using any RAT, including further extensions or updated implementations of 5G (e.g., 5G Advanced) or newer generations of RATs.

FIG. 1 illustrates an exemplary system 100 for use with various aspects of the present disclosure. In practical implementations the system 100 may correspond to any RAT or combinations of RATs, including but not limited to 3G RATs such as GSM, UMTS, CDMA, etc.; 4G RATs such as WiMAX, LTE, etc.; 5G RATs such as NR; NTN RATs; and further extensions or updated implementations of the same. As illustrated, the system 100 includes a cloud platform 110, a core network 120, and a plurality of access nodes 130-1 to 130-m (collectively referred to as access nodes 130), and a plurality of wireless devices 140-1 to 140-n (collectively referred to as wireless devices 140). Other computing systems and devices 150 may be connected to the cloud platform 110, for example to monitor and/or control the wireless devices 140. While FIG. 1 illustrates only two of the access nodes 130, in practical implementations any number of the access nodes 130 (including one) may be present in the system 100. Moreover, while FIG. 1 illustrates seven of the wireless devices 140 and illustrates various subsets of the wireless devices 140 being connected to individual ones of the access nodes 130, the present disclosure is not so limited. In practical implementations, any number of the wireless devices 140 (including zero or one) may be present in total, and any number of such wireless devices 140 (including zero or one) may be connected to each access node 130. As illustrated, various elements of FIG. 1 are connected to one another via wireless connections; however, some of the connections may be wired connections. For example, an access node 130 may be connected to the core network 120 via a wired connection.

The cloud platform 110, which may be an LTE cloud platform, an NR cloud platform, an NTN cloud platform, or a combination thereof may perform processing and forward results to the computing systems and devices 150 and/or the wireless devices 140. The core network 120, which may be an LTE core network, a 5G Core Network (5GCN), an NTN, or combinations thereof, connects with the cloud platform 110 and the access nodes 130. Subsets of the access nodes 130 may be respectively configured to provide service in different areas, on different bands, for different RATs, and so on. FIG. 1 illustrates a situation in which the system 100 is operated by a single network operator. In many geographical areas, multiple access nodes 130 provide coverage that may overlap.

The access nodes 130 communicate with the core network 120 via one or more communication links, each of which may be a direct link (e.g., an N2 link, an N3 link, or the like), a wireless link (e.g., a satellite link), or combinations thereof. The access nodes 130 may further communicate with one another and/or with additional access nodes via a direct link, a wireless link, or combinations thereof. A scheduling entity may be located within the access nodes 130 and/or the core network 120, and may be configured to accept, deny, and route connection requests and manage communication sessions, for example to enforce a selected network topology. The access nodes 130 may be any network node configured to provide communications between the connected wireless devices 140 and the core network 120 and cloud platform 110, including standard access nodes; short range, lower power, small access nodes; or long range non-terrestrial access nodes. As examples of a standard access node, the access nodes 130 may be a macrocell access node, a base transceiver station, a radio base station, a gNodeB in 5G networks, an eNodeB in 4G/LTE networks, or the like, including combinations thereof. In one particular example, the access nodes 130 may be a macrocell access node in which a range of its coverage area is from approximately five to thirty-five kilometers (km) and in which the output power is in the tens of watts (W). As examples of a small access node, the access nodes 130 may be a microcell access node, a picocell access node, a femtocell access node, or the like, including a home gNodeB or a home eNodeB. As examples of a non-terrestrial access node, the access nodes 130 may be a geosynchronous equatorial orbit (GE) satellite, a medium earth orbit (MEO satellite, a low earth orbit (LEO) satellite, or the like.

An access node 130 may comprise one or more electronic processors and associated circuitry to execute or direct the execution of computer-readable instructions such as those described herein. In so doing, the access node 130 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the access node 130 can receive instructions and other input at a user interface.

The wireless devices 140 are devices configured with appropriate technologies for connecting to the cloud platform 110. The wireless devices 140 may be or include mobile communication devices such as smartphones, laptop computers, tablet computers, desktop computers with wireless communication capabilities, and the like; vehicles such as cars, trucks, and the like; connectivity devices such as modems, routers, and the like, and/or Internet-of-Things (IoT) devices such as smart-home sensors or industrial sensors, and the like. A wireless device 140 may include one or more electronic processors and associated circuitry to execute or direct the execution of computer-readable instructions such as those described herein. The wireless device 140 may further include a memory, wireless communication circuitry, and other components. While the present disclosure is presented mainly with regard to 3GPP wireless devices communicating over a radio access network (RAN), in practical implementations one or more of the access nodes 130 and/or wireless devices 140 may be configured to include other types of access mechanisms, including by non-3GPP access nodes and/or non-RAN access.

FIG. 1 illustrates one such case explicitly, in which the wireless device 140-2 is a modem configured as a 5G residential gateway (5G-RG) and the wireless device 140-3 is a non-3GPP device connected thereto, for example via a Wi-Fi or WLAN connection. To provide an "untrusted access" connection, the access node 130-1 may be equipped with a Non-3GPP Interworking Function (N3IWF) to provide access to the 5GCN for the non-3GPP device 140-3 (as well as other non-3GPP devices which are not illustrated but may be present). The N3IWF provides a secure connection via encrypted IP Security (IPSec) for any UE accessing the 5GCN over a non-3GPP access network. To provide a "trusted access" connection, the access node 130-1 may be equipped with a Trusted Non-3GPP Gateway Function (TNGF) to provide access to the 5GCN for the non-3GPP device 140-3. Moreover, the present disclosure is not limited to supporting non-3GPP devices only via an N3IWF, a Trusted Non-3GPP Access Point (TNAP), and/or TNGF, but may also support non-3GPP devices via wireline access. Thus, the systems, methods, and processes described herein may be implemented for any UE connecting to the core network (e.g., the 5GCN) via any access network, including but not limited to 3GPP RANs (e.g., NR), untrusted non-3GPP access networks (e.g., via an N3IWF), trusted non-3GPP access networks (e.g., via a TNAP and TNGF), trusted WLAN access network (e.g., via a TNAP or Trusted WLAN Access Point (TWAP) and Trusted WLAN Interworking Function (TWIF)), wireline access networks (e.g., broadband or cable connections, which may occur via a Wireline Access Gateway Function (W-AGF)), or combinations thereof.

In general, the network provided by the system 100 can be a wired and/or wireless communication network, and can comprise processing nodes, routers, gateways, and physical and/or wireless data links for carrying data among various network elements, including combinations thereof, and can include a local area network (LAN) or a wide area network (WAN), and an internetwork (including the Internet). The network can be capable of carrying data, for example to support voice, push-to-talk (PTT), broadcast video, and/or data communications by the wireless devices 140. Wireless network protocols can comprise Multimedia Broadcast Multicast Services (MBMS), CDMA, 1xRTT, GSM, UMTS, High Speed Packet Access (HSPA), Evolution-Data Optimised (EV-DO), EV-DO rev. A, 3GPP LTE, WiMAX, 4G including LTE Advanced and the like, and 5G including 5G NR or 5G Advanced, or combinations thereof. Wired network protocols that may be utilized by the network comprise Ethernet, Fast Ethernet, Gigabit Ethernet, Local Talk (e.g., Carrier Sense Multiple Access with Collision Avoidance), Token Ring, Fiber Distributed Data Interface (FDDI), and Asynchronous Transfer Mode (ATM). The network may also comprise additional base stations, controller nodes, telephony switches, internet routers, network gateways, computer systems, communication links, other types of communication equipment, and combinations thereof.

The communication links 160 connecting various components of the system 100 may respectively use various communication media, such as air, space, metal, optical fiber, other signal propagation paths, and combinations thereof. The communication links may respectively be wired or wireless and use various communication protocols such as Internet, Internet protocol (IP), LAN, optical networking, hybrid fiber coax (HFC), telephony, T1, other communication formats, and combinations, improvements, or variations thereof. Wireless communication links may use electromagnetic waves in the radio frequency (RF), microwave, infrared (IR), or other wavelength ranges, and may use a suitable communication protocol, including but not limited to MBMS, CDMA, 1xRTT, GSM, UMTS, HSPA, EV-DO, EV-DO rev. A, 3GPP LTE, WiMAX, 4G including LTE Advanced and the like, and 5G including 5G NR or 5G Advanced, NTN, 6G, or combinations thereof. The communication links may respectively be a direct link or might include various equipment, intermediate components, systems, and networks. The communication links may comprise many different signals sharing the same link.

In a 5G implementation, the cloud platform 110, the core network 120, and/or the access nodes 130 may collectively implement several control plane network functions (NFs) and user plane NFs. The control plane NFs include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The user plane NFs include but are not limited to a User Plane Function (UPF). Control plane NFs can provide one or more NFs based on a request-response or subscribe-notify model. In some implementations, the PCF implements the URSP manager. The NFs may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the core network 120. To use other network functions, registered functions can send service requests to the NRF.

The UDM interfaces with NFs such as AMF and SMF so that relevant data becomes available to AMF and SMF. The UDM generates authentication vectors when requested by the AUSF, which acts as an authentication server. The AMF performs the role of access point to the core network 120, thereby terminating RAN control plane and UE traffic originating on either the N1 or N2 reference interface. In the core network 120, the functionality of the 4G Mobility Management Entity (MME) is decomposed into the AMF and the SMF. The AMF receives all connection and session related information from the UE using N1 and N2 interfaces, and is responsible for handling connection and mobility management tasks.

A Unified Data Repository (UDR) may also be present. The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QoS) handling, etc. When compared with 4G EPC, the functions of the UPF may resemble those of the SGW-U (Serving Gateway User Plane function) and PGW-U (PDN Gateway User Plane function).

In an NTN implementation, there may be a RAN serving multiple UEs by a radio frequency transmission provided by utilizing orbiting satellites that may be in communication with access nodes (e.g., some of the access nodes 130) of a terrestrial network (TN). The NTN includes NTN nodes that are not stationed on the ground as a complement to the TNs. The NTN may be one of three types of satellite-based NG-RAN architectures: transparent satellite-based NG-RAN, regenerative satellite-based NG-RAN, and multi-connectivity involving satellite-based NG-RAN. Transparent satellite-based NG-RAN implements frequency conversion and a radio frequency amplifier in both uplink and downlink directions. Several transparent satellites may be connected to the same gNB on the ground through New Radio Uplink Unicast (NR-Uu). Regenerative satellite-based NG-RAN implements regeneration of the signals received from earth. The satellite payload also provides Inter-station Signaling Links (ISL) between satellites. An ISL may be a radio interface or an optical interface that may be 3GPP or non-3GPP defined. The regenerative satellite-based NGRAN architecture may be gNB processed payload (has both gNB Centralized Unit (gNB-CU) and gNB Distributed Unit (gNB-DU)) processed payload. Multi-connectivity involving satellite-based NG-RAN applies to transparent satellites as well as regenerative satellites with gNB or gNB-DU function on board.

Other network elements may be present in the system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the access node 130 and the core network 120.

In determining the network topology to be implemented in the system 100, a processing node in the system 100 (e.g., in a component of the cloud platform 110, in a component of the core network 120, in an access node 130, and/or in another computing system or device 150) may implement an integer programming model. The integer programming model may utilize a formulation based on several parameters and/or boundary conditions. One example of such a formulation is provided as follows; however, it should be understood that this example is not limiting and that other approaches to formulating the integer programming model are within the scope of the present disclosure.

Figure 2:
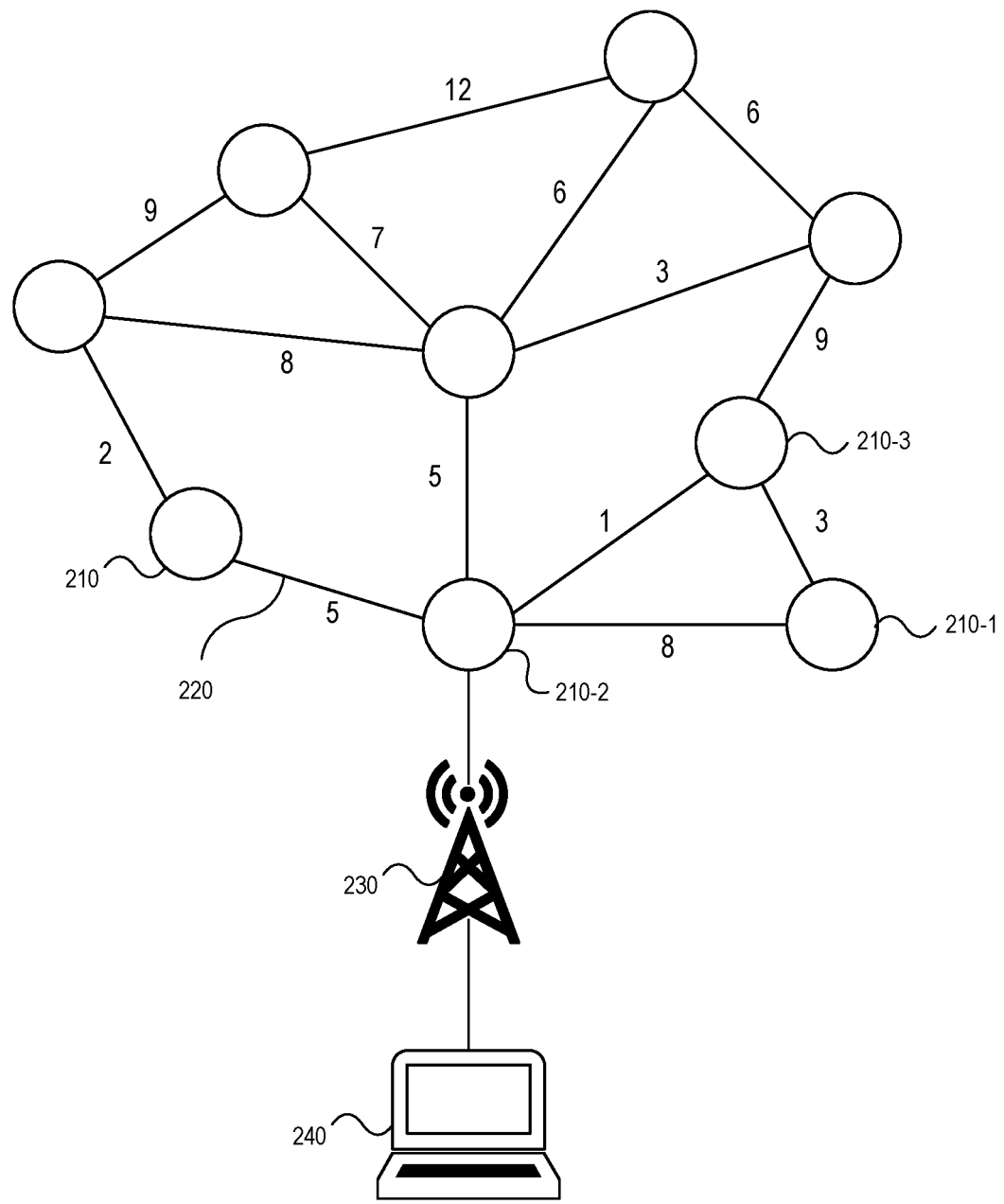
FIG. 2 illustrates an exemplary configuration of a system for wireless communication in accordance with various aspects of the present disclosure

An exemplary network is illustrated in FIG. 2, which includes a plurality of network nodes 210 which are connected to one another by a plurality of segments 220. Each of the network nodes 210 may be, without limitation, an access node, a relay node, a content server, and the like. One of the network nodes 210 is connected to an access node 230, which may in some implementations correspond to one of the access nodes 130 illustrated in FIG. 1 and described above. The access node 230 is connected to a wireless device 240, which may correspond to one of the wireless devices 140 illustrated in FIG. 1 and described above. As noted above, the wireless device 240 may be connected to the network via any access network, including but not limited to 3GPP RANs (e.g., NR), untrusted non-3GPP access networks (e.g., via an N3IWF), trusted non-3GPP access networks (e.g., via a TNAP and TNGF), trusted WLAN access network (e.g., via a TNAP or TWAP and TWIF), wireless access networks (e.g., broadband or cable connections, which may occur via a W-AGF), or combinations thereof. As illustrated, each segment 220 has a particular weight, which may correspond to the distance between the network nodes 210 connected by the segment 220, the amount of latency introduced by the segment 220, and the like. As can be seen from FIG. 2, it is not necessarily the case that the most direct route between two network nodes 210 is the shortest or exhibits the least latency. Only three of the network nodes 210 are particularly labeled for clarity of explanation in this regard. In the illustrated example, the network node 210-1 is directly connected to the network node 210-2 by a segment 220 which has a weight of 8. However, the network node 210-1 is also indirectly connected to the network node 210-2 via an intermediate network node 210-3. The indirect path includes a segment 220 which has a weight of 3 and a segment 220 which has a weight of 1. Thus, the indirect path between the network node 210-1 and the network node 210-2 via the network node 210-3 is, from a network topology standpoint, shorter than the direct path between the network node 210-1 and the network node 210-2, even if the indirect path is longer than the direct path in terms of physical length.

For a given network topology and given set of metaverse services, the processing node may denote the candidate node locations (e.g., the locations of the network nodes 210 which may be selected for a given service path) at which a metaverse service management client can be deployed as $x_i$, where i is an integer from 1 to n (n being the total number of candidate node locations). The processing node may denote the metaverse service types as $H^k$, where k is an integer from 1 to m (m being the total number of metaverse service types). Each metaverse service type $H^k$ has its own set of network requirements for latency, bandwidth, and system capabilities, and thus may be expressed as $H^k$=(Latency$^k$, Bandwidth$^k$, System$^k$). The latency may correspond to the maximal round trip network latency in milliseconds (ms). The bandwidth may correspond to the average bandwidth per user in megabits per second (Mbps). The system capabilities may correspond to some resource requirement in terms of memory, central processing unit (CPU), and/or graphics processing unit (GPU) capabilities per average active user. Other network requirements may be present, such as class of service or packet loss ratio, but these are omitted here for ease of explanation.

The site selection plan may be expressed as a matrix $(x_i^k)_{n \times m}$ according to the following expression (1):

$$x_i^k = \begin{cases} 1, & \text{if site } i \text{ is selected for deploying } kth \text{ metaverse service client} \\ 0, & \text{if site } i \text{ is not selected for } kth \text{ metaverse service client} \end{cases} \quad (1)$$

In expression (1) above, i and k are index integers corresponding to the candidate node locations and metaverse service types as described above. The processing node may further denote $x^k=(x_i^k, x_i^k, \ldots, x_i^k)^T$, corresponding to the n×1 vector for the $k^{th}$ metaverse site selection plan, and X=($x^1, x^2, \ldots, x^m$), corresponding to the n×m matrix of the site selection plan by all metaverse types.

The processing node may then compute the site connectivity, denoting L=[$l_{ij}$] as an n×n matrix in which $l_{ij}$=1 if nodes i and j have a direct connection and $l_{ij}$=0 otherwise. Thus, L is an adjacency matrix. Using the matrix L, the processing node can construct the matrix for nodes based on the number of hops from endpoint to endpoint by matrix multiplication. For example, $L^2$=L×L (non-zero entries normalized to 1) would be the matrix of connections with up to two hops, $L^3$=$L^2$×L (non-zero entries normalized to 1) would be the matrix of connections with up to three hops, and so on. In this notation, the processing node may assume that the network nodes are connected for all pair of nodes with some non-infinite number of hops, such that there is no isolated node in the network.

The processing node may then compute the shortest path and the number of hops corresponding to the shortest path. The processing node may define a distance parameter D=[$d_{ij}$] as an n×n matrix in which $d_{ij}$ is the transport distance (e.g., in units of miles) of a direct connection or 0 if there is no direct connection. Thus, D is a distance matrix. using the matrices L and D, the processing node can construct the minimal routing distance by given numbers of hops and (correspondingly) the numbers of hops for the minimal distance route. For example, the expression $D^2$=D∘D (where ∘ is the distance product operator) gives the shortest distance connection up to two hops, $D^3$=$D^2$∘D gives the shortest distance connection up to three hops, and so on. During the calculation of the shortest distance using the distance product, the processing node can also record the shortest distance path(s) between any two nodes. These computations may be performed using, for example, Dijkstra's algorithm to calculate the shortest path between any two sites, Kruskal's minimal tree algorithm for approximation by specifying two nodes to keep, and so on. Having done the necessary computation, the processing node may denote D' and H' to be the n×n matrices of the minimal distance and the associated numbers of hops up to r hops, respectively, where r is an integer.

The network is fully connected by some number $\mathcal{L}$ of hops. The processing node may calculate 2 as the minimal number such that $D^{\mathcal{L}+1}$=$D^{\mathcal{L}}$, in which $D^{\mathcal{L}}$=$(d_{ij}^{\mathcal{L}})_{n \times n}$ is the matrix of the shortest distance between locations i and j for any i and j in which $1 \le i < j \le n$; $H^{\mathcal{L}}$=$(h_{ij}^{\mathcal{L}})_{n \times n}$ is the matrix of the number of hops from i to j along the shortest path for any i and j in which $1 \le i < j \le n$; and L(i,j)={$x_i, x_{hop1}, \ldots, x_{hopk}$=$x_j$}, where $k \le \mathcal{L}$, for any i and j in which $1 \le i < j \le n$. It can be seen that the value of $h_{ij}^{\mathcal{L}}$ is the cardinal function |L(i,j)|−1 and the value of $d_{ij}^{\mathcal{L}}$ is the sum of the direct distance entry (of the distance matrix D) along the path L(i,j).

Given any site selection x=$(x_1, x_2, \ldots, x_n)^T$, n×1 (i.e., the n×1 vector for the $k^{th}$ metaverse site selection plan described above), the processing node may determine how the traffic would be routed from unselected sites to the selected sites, how many hops the routes include, and/or what distance the traffic will be transported, so as to estimate latency by factors such as distance and jitter (which may be caused by the hops) and the cost of transport. In so doing, the processing node may derive a homing table H by the shortest path set, for example as expressed in the following expression (2).

$$H(x)=(L(1,j_{1x}),L(2,j_{2x}), \ldots ,L(n,j_{nx}))^T, \quad (2)$$

where $j_{ix}$=augmix{$d_{ik}^{\mathcal{L}}, x_k \ne 0$, k=1, 2, . . . , n}, i=1, 2, . . . , n In expression (2) above, the "augmix" function returns the index of the site that the $i^{th}$ site homes to (i.e., the nearest location selected). L(i, $j_{ix}$) is the short path of L(i, j) for a given i. Therefore, the function H(x) maps each entry site with the nearest homing location together with the routing path based on the given site selection x=$(x_1, x_2, \ldots, x_n)^T$.

Initially, for any given metaverse service, the processing node may select any particular set of sites to deploy (e.g., in an arbitrary manner). Over time, the network may be able to accumulate sufficient statistics about the community interest metric, which corresponds to the entry demands of the users from each location. The processing node may denote $CMI_i^k$ to represent the community of interest statistics at site i for metaverse service k, where (as above) i is an integer from 1 to n and k is an integer from 1 to m. This quantity may represent, for example, the average active customers during a given period (e.g., during a "rush hour") from the given location for the metaverse service under consideration. As noted above, the average bandwidth per user is represented by Bandwidth$^k$, and thus the amount of bandwidth demanded at the entry site i may be represented as $CMI_i^k \times$ Bandwidth$^k$ in Mbps.

Now, given the site selection plan for the k$^{th}$ metaverse service $x=(x_1, x_2, \ldots, x_n)^T$, the processing node may determine the manner in which to allocate the entry bandwidth to links and sites after the enter the network. Based on the homing table $H(x^k)$, the processing node can allocate the entry bandwidth demand to all sites (e.g., the network nodes 210) along the homing path derived. At a high level, the computing procedure performed by the processing node may include a series of operations. First, for each metaverse service k and site selection $x^k$, the processing node may assign the entry bandwidth $CMI_i^k \times$Bandwidth$^k$ to each link (e.g., each segment 220) and node along the path $L(i, j_{ix(k)})$ for all i, and may repeat the process for all k.

Second, the processing node may sum the assigned bandwidth demand by the same nodes and links for all the metaverse, defined according to the following expressions (3) and (4):

$$BM(X) \equiv (BL_{ij})_{n \times m} \quad (3)$$

$$(DP_i)_{n \times 1} = (BL_{ii})_{n \times 1} \equiv DP(X) \quad (4)$$

In expression (3) above, $BL_{ij}$ represents the sum of the total bandwidth by direct links, and may be 0 if sites i and j are not directly connected (excepting the case i=j). In expression (4) above, $DP_i$ represents the demand by the i$^{th}$ node and $X=[x^1, x^2, \ldots, x^n]$ is the given site selection plan. Third, the processing node may calculate the average active users by the community of interest $CMI_i^k$ allocated to site locations based on the homing table. This may be used for computing the cost on the metaverse management client. This process resembles the operation of assigning the entry bandwidth $CMI_i^k \times$Bandwidth$^k$ without applying the bandwidth, followed by summing the assigned demand at the homing sites by each given metaverse service type k. The result is an n×m matrix corresponding to the site selection plan, which may be given by the following expressions (5) and (6):

$$d_{ik}^{user} = x_i^k \sum_{site\ l\ home\ to\ site\ i|H(x^k)} CMI_l^k \quad (5)$$

$$D_{user}(X) \equiv (d_{ik}^{user})_{n \times m} \quad (6)$$

In expression (5) above, $d_{ik}^{user}$ may be zero if site i is not selected for metaverse service k. Each column of the matrix corresponds to the lists of user demands at network locations by the corresponding metaverse service and its site selection plan $x^k$.

The processing node may then determine the cost formulation of a given site selection plan X, with two components: for each metaverse service k, the deployment cost for client management based on the site selection; and the transport and port cost at each location by given metaverse service and site selection plan. The cost for the k$^{th}$ metaverse management client may then be represented according to the following expression (7):

$$CB^k \sum_{i=1}^{n} \mathrm{mod}(d_{ik}^{user}, CI^k) \quad (7)$$

In expression (7) above, $CB^k$ and $CI^k$ represent the basic deployment costs of client management and the amount of client users that can be supported based on the basic deployment for the k$^{th}$ metaverse service, and may include the cost of both hardware and software. Different metaverse services may have different costs due to differences in computation and memory requirements. The "mod" function determines how many basic builds are required to accommodate the given demands at the given location for the metaverse service k. Accordingly, the total cost of metaverse management clients for all metaverse services may be represented by the following expression (8):

$$CC(X) \equiv \sum_{k=1}^{m} CB^k \sum_{i=1}^{n} \mathrm{mod}(d_{ik}^{user}, CI^k) \quad (8)$$

The total cost $CC(X)$ is a function of the site selection plan X because $d_{ik}^{user}$ depends on $x_i^k$, as can be seen from expression (5) above.

Next, the processing node may determine the transport-related cost. In this regard, it may be assumed that the transport and port costs are proportional to the bandwidth transport, although in practical implementations the network operator may reserve a certain amount of throughput (i.e., capacity) in the network to ensure a certain level of network reliability. The cost of such reservation will be shared by all services. The network cost will be directly proportional to the size of the bandwidth and to the distance across which the network transports. Thus, for a given site selection plan X, the transport and port cost may be represented according to the following expression (9):

$$NC(X,Y) \equiv NPV(\{\tau BL_{ij} \times d_{ij} + \rho \Sigma DP_i\}, r, Y) \quad (9)$$

In expression (9), r represents the annual network transport cost in Mbps/mile, p represents the annual port cost by Mbps, and Y represents the duration of the investment cycle in years, which may be selected by the network operator based on the lifecycle of the services being considered. $BL_{ij}$ is the total link demand by link (i, j), $d_{ij}$ is the distance of link (i, j), and $DP_i$ is the port demand by site i. The function "NPV" converts each future year's values to the net present value and sums them up, where r is the interest rate and the expression in curly braces is the financial time series. Combining expressions (8) and (9), the cost function may be represented as the following expression (10):

$$J(X,Y) = CC(X) + NC(X,Y) \quad (10)$$

The processing node may then determine the constraints on the cost function, which includes latency requirements and network capacity constraints. The latency requirement may be expressed according to the following expression (11):

$$\frac{0.82}{100} \mathrm{Length}_L(i, j_{ix}(k)) + \delta \times \mathrm{hops}_L(i, j_{ix(k)}) \leq \mathrm{Latency}^k \quad (11)$$

In expression (11), the factor 0.082/100 is experimentally determined by loss-of-speed measures, and corresponds to 0.82 ms of latency per 100 miles of network transport. The quantity δ represents the jitter of each hop in ms. In some implementations, the quantity δ×hops$_L$ may further include latency introduced by the network devices (e.g., switches or routers) at each hop, for example due to the processing time of the device. For each metaverse service k, the transport latency plus hop-induced jitter will generally not exceed Latency$^k$. Given the site selection for the k$^{th}$ metaverse service, the processing node can obtain the homing table H(x$^k$) (see expression (2) above), where L is the homing path based on the site selection. The network capacity constraints may be expressed according to the following expression (12):

$$\frac{1}{\xi} BM(X) \le B \quad (12)$$

In expression (12), B represents an n×m matrix with entries of the maximal expandable capacity (in Mbps) of any directly connected link. Because the network may carry services other than metaverse services, B may correspond to the maximal leftover capacity for metaverse services. The quantity represents the operational fill rate to assure service reliability, and may be expressed as a percentage (e.g., 85%). The expression BM(X) is described with regard to expression (3) above.

The network may also have space limitations by sites. As noted above, the k$^{th}$ metaverse service has computer resource requirements System$^k$ per average active user. The processing node may formulate the requirements by, for example, the number of CPUs and/or GPUs required, necessary amount of RAM, hard disc capacity, logical shared storage capacity, power consumption, temperature management (e.g., cooling), and physical space required, according to the following expression (13):

$$\sum_{k=1}^{m} S^k \text{mod}(d_{ik}^{user}, CI^k) \le S_i \quad (13)$$

The physical space required for the chassis to support up to CI$^k$ active users, based on a basic deployment configuration, is represented by S$^k$. S is an n×1 vector of the available space at sites for metaverse services. Expression (13) indicates that, for each given site i, the total space required by all metaverse services based on the demand should not exceed the leftover space Si of the site i.

Finally, the processing node may formulate the network topology problem using an integer programming formulation, based on the above expressions (1) to (13), as the following expression (14):

$$\text{Minimize}_x J(X, Y) \text{ subject to: } \frac{0.82}{100}$$

$$\text{Length}_L(i, j_{ix}(k)) + \delta \times \text{hops}_L(i, j_{ix(k)}) \le \text{Latency}^k, \frac{1}{\xi} BM(X) \le B, \text{ and}$$

$$\sum_{k=1}^{m} S^k \text{mod}(d_{ik}^{user}, CI^k) \le S_i$$

By solving the integer programming formulation of expression (14), the processing node determines the network topology (site selection plan X*) which satisfies the three constraints and minimizes the cost function J(X*, Y). For the given network topology, the processing node may, in some implementations, proceed to compute the homing table H(X*), the bandwidth allocation over links and ports, and/or the costs and constraints described above. The processing may occur in an iterative manner, such that each iteration repeats the computation on the numbers related to the site selection plan X.

In some cases, the costs and constraints parameters may change over time, for example due to changing traffic characteristics and performance (e.g., data rate, packet drop, etc.). The processing node may monitor the network to determine if the metaverse application performance metrics such as latency and bandwidth change over time, and can trigger notifications requesting resources to be updated. For example, the processing node may request to move the metaverse application to another location, to boost computation or memory resources at the current location, and so on. As such, the above operations and determinations may be repeated over time.

Figure 3:
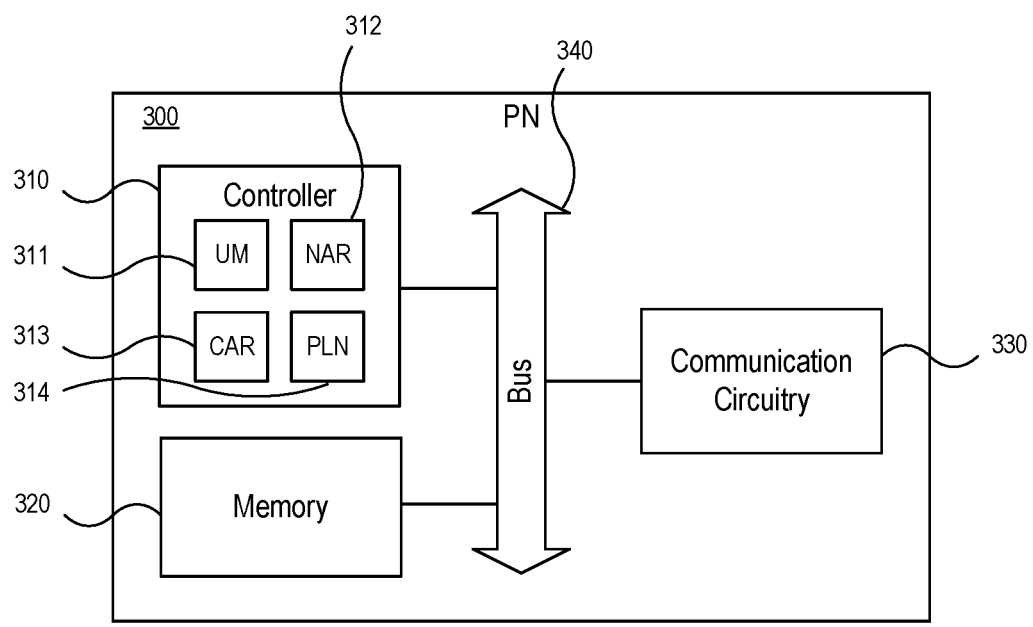
FIG. 3 illustrates an exemplary access node in accordance with various aspects of the present disclosure.

FIG. 3 illustrates one example of a processing node 300, which may correspond to one or more of the access nodes 130 shown in FIG. 1, one or more of the network nodes 210 shown in FIG. 2, or another computing device in the network. The processing node is configured to implement the systems and methods of managing network topology described herein. As illustrated the processing node 300 includes a controller 310, a memory 320, communication circuitry 330, and a bus 340 through which the various elements of the processing node 300 communicate with one another. The controller 310 is one example of an electronic processor, and may include sub-modules or units, each of which may be implemented via dedicated hardware (e.g., circuitry), software modules which are loaded from the memory 320 and processed by the controller 310, firmware, and the like, or combinations thereof. These include a user metrics module 311, a network-associated requirements module 312, a computing-system-associated requirements module 313, and a network-site implementation plan generation module 314. Some or all of the sub-modules or units may physically reside within the controller 310, or may instead reside within the memory 320 and/or may be provided as separate units within the access node 300, in any combination. The various sub-modules or units may include or implement logic circuits, thereby to perform operations such as setting parameters, monitoring parameters, comparing parameters, generating instructions, and so on.

While FIG. 3 illustrates the user metrics module 311, the network-associated requirements module 312, the computing-system-associated requirements module 313, and the network-site implementation plan generation module 314 as being separate modules, in practical implementations some of the modules may be combined with one another and/or may share components (e.g., logic gates). Through the user metrics module 311, the network-associated requirements module 312, the computing-system-associated requirements module 313, and the network-site implementation plan generation module 314, the access node 300 (e.g., the controller 310) may be configured to perform various operations to implement methods in accordance with the present disclosure. While one example of operations performed by the modules is described here, in practical implementations at least some of the operations described as being performed by one module may instead be performed by another module, including a module not explicitly named here.

The user metrics module 311 may be configured to obtain or receive user metrics associated with a community of interest. For example, the user metrics module 311 may be configured to receive data from the memory 320, from an external device via the communication circuitry 330, and so on. In other examples, the user metrics module 311 may calculate or derive the user metrics itself based on data received from another source, such as the memory 320, the communication circuitry 330, and so on. The user metrics associated with the community of interest include at least one of an average customer usage per service type and an average traffic customer profile. As described above, the user metrics associated with the community of interest may include data regarding morphology of user distribution, such as the geographic location of originating and/or terminating users, and/or at least one of an average customer usage per service of the plurality of services and an average traffic customer profile. The user metrics may be, or may be represented as, $CMI_t^k$ described above. In some implementations, the user metrics is expressed as a matrix and/or stored as a data table or data vector.

The network-associated requirements module 312 may be configured to obtain or receive network-associated requirements for each of a plurality of services deployed on a network (which may be the network in which the processing node resides 300 or another network), at least a portion of the plurality of services being metaverse services. For example, the network-associated-requirements module 312 may be configured to receive data from the memory 320, from an external device via the communication circuitry 330, and so on. In other examples, the network-associated requirements module 311 may calculate or derive the network-associated requirements itself based on data received from another source, such as the memory 320, the communication circuitry 330, and so on. Each service of the plurality of services may include service type. As described above, the network-associated requirements may include data regarding latency, bandwidth, overall speed, class of service, QoS, touting, packet loss, and the like. In one example, the network-associated requirements for each of the plurality of services may include a maximum network latency and a bandwidth requirement per average user. In another example, the network-associated requirements for each of the plurality of services include at least one of a maximum network latency, a bandwidth requirement per average user, a maximum packet loss ratio, and service availability. The network-associated metrics may be, or may be represented as, $Latency^k$ and/or $Bandwidth^k$ described above. In some implementations, the network-associated requirements are expressed as a matrix and/or stored as a data table or data vector.

The computing-system-associated requirements module 313 may be configured to obtain or receive computing-system-associated requirements for each of the plurality of services. For example, the computing-system-associated requirements module 313 may be configured to receive data from the memory 320, from an external device via the communication circuitry 330, and so on. In other examples, the computer-system-associated requirements module 311 may calculate or derive the computer-system-associated requirements itself based on data received from another source, such as the memory 320, the communication circuitry 330, and so on. In one example, the computing-system-associated requirements for each of the plurality of services includes one or more of CPU requirements, GPU requirements, RAM requirements, hard disc capacity requirements, logical shared storage capacity, power consumption, temperature management, and physical space requirements. The computer-system-associated metrics may be, or may be represented as, $System^k$ described above. In some implementations, the computer-system-associated requirements are expressed as a matrix and/or stored as a data table or data vector.

The network-site implementation plan generation module 314 may be configured to, based on the user metrics, the network-associated requirements, and the computing-system-associated requirements, generate a network-site implementation plan recommendation that minimizes one or more cost functions. For example, the network-site implementation plan generation module 314 may be configured to minimize the cost function J(X, Y) subject to the constraints described above, for example with regard to expression (14). The network-site implementation plan may include, at least in part, a list of master servicing sites for deployment to run the plurality of services.

Returning to FIG. 3, the communication circuitry 330 may include circuit elements configured for inbound communication to receive wireless signals (e.g. one or more receiving antennas) and wired signals as well as interface elements configured, for example, to translate data signals from wireless or wired input into control or other signals for the controller 310. Moreover, the communication circuitry 330 may include circuit elements configured for outbound communication to generate wireless signals (e.g., one or more transmitting antennas) or wired signals as well as interface elements configured, for example, to translate control signals from the controller 310 into data signals for wireless or wired output. For example, the processing node 300 may be configured to receive communications from external devices via the communication circuitry 330 and output communications and/or control signals or instructions to the external devices via the communication circuitry 330, thereby managing network topology. The processing node 300 may include additional communication circuitry elements, for example to communicate using additional frequencies or interfaces, and/or to provide connectivity for different communication protocols.

Figure 4:
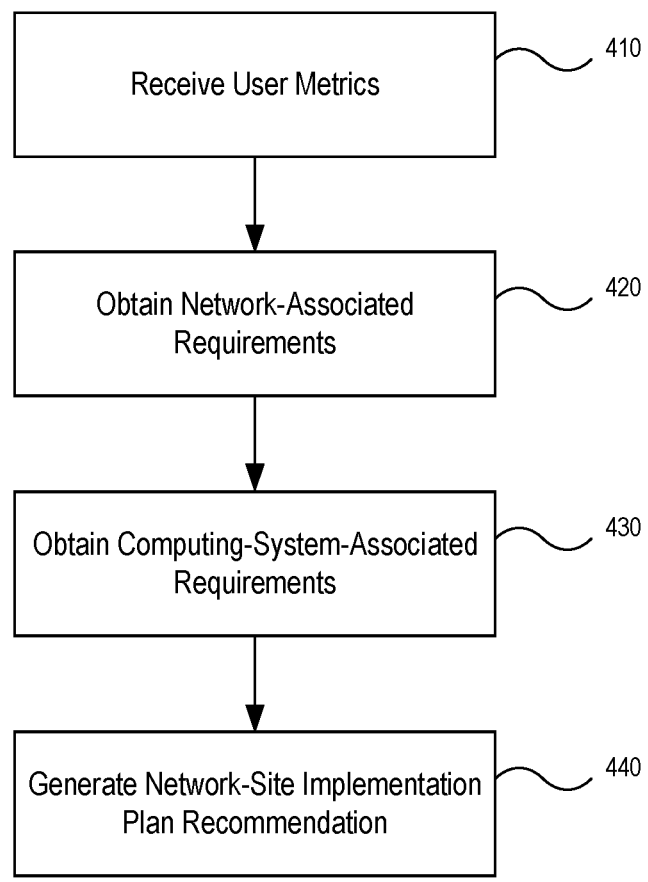
FIG. 4 illustrates an exemplary wireless device in accordance with various aspects of the present disclosure.

Examples of network topology management operations collectively performed by the user metrics module 311, the network-associated requirements module 312, the computing-system-associated requirements module 313, and the network-site implementation plan generation module 314 are illustrated in FIG. 4. In particular, FIG. 4 illustrates an exemplary process flow for managing network topology. The operations of FIG. 4 will be described as being performed by the processing node 300 for purposes of explanation. In other implementations, the operations may be performed by or under the control of a processing node external to the processing node 300. Generally, the process flow of FIG. 4 may be implemented using any processing node that is configured to manage a network topology for metaverse services.

The process flow begins at operation 410 with receiving user metrics associated with a community of interest. The user metrics associated with the community of interest include at least one of an average customer usage per service type and an average traffic customer profile. As described above, the user metrics associated with the community of interest may include data regarding morphology of user distribution, such as the geographic location of originating and/or terminating users, and/or at least one of an average customer usage per service of the plurality of services and an average traffic customer profile. The user metrics may be, or may be represented as, $CMI_t^k$ described above. In some implementations, the user metrics is expressed as a matrix and/or stored as a data table or data vector.

The process flow continues to operation 420 with obtaining network-associated requirements for each of a plurality of services deployed on a network, at least a portion of the plurality of services being metaverse services. Each service of the plurality of services may include service type. As described above, the network-associated requirements may include data regarding latency, bandwidth, overall speed, class of service, QoS, routing, packet loss, and the like. In one example, the network-associated requirements for each of the plurality of services may include a maximum network latency and a bandwidth requirement per average user. In another example, the network-associated requirements for each of the plurality of services include at least one of a maximum network latency, a bandwidth requirement per average user, a maximum packet loss ratio, and service availability. The network-associated metrics may be, or may be represented as, $Latency^k$ and/or $Bandwidth^k$ described above. In some implementations, the network-associated requirements are expressed as a matrix and/or stored as a data table or data vector.

The process flow continues to operation 430 with obtaining computing-system-associated requirements for each of the plurality of services. In one example, the computing-system-associated requirements for each of the plurality of services includes one or more of CPU requirements, GPU requirements, RAM requirements, hard disc capacity requirements, logical shared storage capacity, power consumption, temperature management, and physical space requirements. The computer-system-associated metrics may be, or may be represented as, $System^k$ described above. In some implementations, the computer-system-associated requirements are expressed as a matrix and/or stored as a data table or data vector.

The process flow further includes operation 440 of, based on the user metrics, the network-associated requirements, and the computing-system-associated requirements, generating a network-site implementation plan recommendation that minimizes one or more cost functions. Thus, operation 440 may receive, as inputs, the outputs of operations 410, 420, and 430. In examples, operation 440 includes minimizing the cost function $J(X, Y)$ subject to the constraints described above, for example with regard to expression (14). The network-site implementation plan may include, at least in part, a list of master servicing sites for deployment to run the plurality of services.

The operations of FIG. 4 need not necessarily be performed one after another in immediate sequence. For example, operations 410, 420, and 430 may be performed in any order, and combinations of operations 410, 420, and 430 may be performed in parallel. Moreover, after operation 440 is performed, the process flow of FIG. 4 may return to operation 410 so as to continually or continuously update the information on which the network-site implementation plan is based. In this manner, the process flow of FIG. 4 may be performed repeatedly in an iterative manner. In subsequent passes through the process flow, one or more of operations 410, 420, and 430 may be omitted. For example, while an initial performance of the process flow may include each of operations 410, 420, and 430, subsequent operations may omit operation 430 and instead rely on information acquired from the initial performance of the process flow.

The exemplary systems and methods described herein may be performed under the control of a processing system executing computer-readable codes embodied on a non-transitory computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of managing network topology, the method comprising:
    receiving user metrics associated with a community of interest;
    obtaining network-associated requirements for each of a plurality of services deployed on a network, at least a portion of the plurality of services being metaverse services;
    obtaining computing-system-associated requirements for each of the plurality of services; and based on the user metrics, the network-associated requirements, and the computing-system-associated requirements, generating a network-site implementation plan recommendation that minimizes one or more cost functions;

wherein the user metrics associated with the community of interest include at least one of an average customer usage per service of the plurality of services and an average traffic customer profile.

2. The method of claim 1, wherein each service of the plurality of services includes a service type, and wherein the user metrics associated with the community of interest include at least one of an average customer usage per service type and an average traffic customer profile.

3. The method of claim 1, wherein the network-associated requirements for each of the plurality of services include a maximum network latency and a bandwidth requirement per average user.

4. The method of claim 1, wherein the network-associated requirements for each of the plurality of services include at least one of a maximum network latency, a bandwidth requirement per average user, a maximum packet loss ratio, and service availability.

5. The method of claim 1, wherein the computing-system-associated requirements for each of the plurality of services include one or more of Central Processing Unit (CPU) requirements, Graphical Processing Unit (GPU) requirements, Random Access Memory (RAM) requirements, hard disc capacity requirements, logical shared storage capacity, power consumption, temperature management, and physical space requirements.

6. The method of claim 1, wherein the network-site implementation plan recommendation comprises, at least in part, a list of master servicing sites for deployment to run the plurality of services.

7. A node comprising:
at least one processor programmed to perform multiple operations, the operations including:
receiving user metrics associated with a community of interest;
obtaining network-associated requirements for each of a plurality of metaverse services deployed on a network;
obtaining computing-system-associated requirements for each of the plurality of metaverse services; and
based on the user metrics, the network-associated requirements, and the computing-system-associated requirements, generating a network-site implementation plan recommendation for deploying a plurality of master services sites to run the plurality of metaverse services;
wherein the user metrics associated with the community of interest include at least one of an average customer usage per metaverse service of the plurality of metaverse services and an average traffic customer profile.

8. The node of claim 7, wherein each metaverse service of the plurality of metaverse services includes a service type, and wherein the user metrics associated with the community of interest include at least one of an average customer usage per service type and an average traffic customer profile.

9. The node of claim 7, wherein the network-associated requirements for each of the plurality of metaverse services include a maximum network latency and a bandwidth requirement per average user.

10. The node of claim 7, wherein the network-associated requirements for each of the plurality of metaverse services include at least one of a maximum network latency, a bandwidth requirement per average user, a maximum packet loss ratio, and metaverse service availability.

11. The node of claim 7, wherein the computing-system-associated requirements for each of the plurality of services include one or more of Central Processing Unit (CPU) requirements, Graphical Processing Unit (GPU) requirements, Random Access Memory (RAM) requirements, hard disc capacity requirements, logical shared storage capacity requirements, power consumption requirements, temperature management requirements, and physical space requirements.

12. A non-transitory computer-readable medium storing instructions that when executed by a processor cause the processor to perform operations comprising:
receiving user metrics associated with a community of interest;
obtaining network-associated requirements for each of a plurality of services deployed on a network, at least a portion of the plurality of services being metaverse services;
obtaining computing-system-associated requirements for each of the plurality of services; and
based on the user metrics, the network-associated requirements, and the computing-system-associated requirements, generating a network-site implementation plan recommendation that minimizes one or more cost functions;
wherein the user metrics associated with the community of interest include at least one of an average customer usage per service of the plurality of services and an average traffic customer profile.

13. The non-transitory computer-readable medium of claim 12, wherein each service of the plurality of services includes a service type, and wherein the user metrics associated with the community of interest include at least one of an average customer usage per service type and an average traffic customer profile.

14. The non-transitory computer-readable medium of claim 12, wherein the network-associated requirements for each of the plurality of services include a maximum network latency and a bandwidth requirement per average user.

15. The non-transitory computer-readable medium of claim 12, wherein the network-associated requirements for each of the plurality of services include at least one of a maximum network latency, a bandwidth requirement per average user, a maximum packet loss ratio, and service availability.

16. The non-transitory computer-readable medium of claim 12, wherein the computing-system-associated requirements for each of the plurality of services include one or more of Central Processing Unit (CPU) requirements, Graphical Processing Unit (GPU) requirements, Random Access Memory (RAM) requirements, hard disc capacity requirements, logical shared storage capacity, power consumption, temperature management, and physical space requirements.

17. The non-transitory computer-readable medium of claim 12, wherein the network-site implementation plan recommendation comprises, at least in part, a list of master servicing sites for deployment to run the plurality of services.

* * * * *